A. R. PRIBIL.
CONNECTING ROD.
APPLICATION FILED DEC. 26, 1916.
1,276,109.
Patented Aug. 20, 1918.
2 SHEETS—SHEET 2.
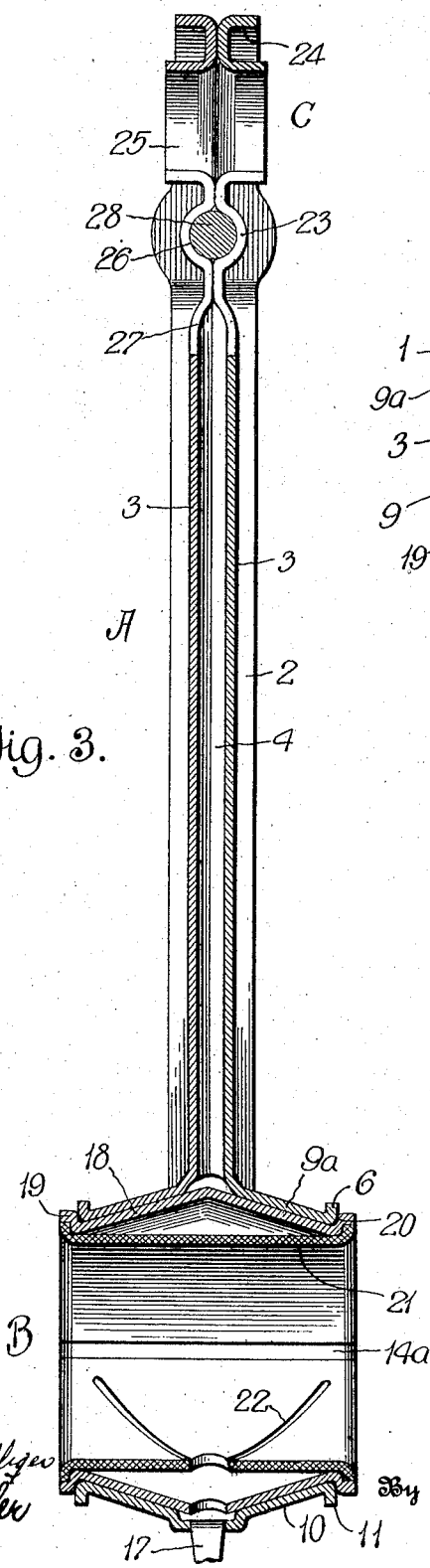
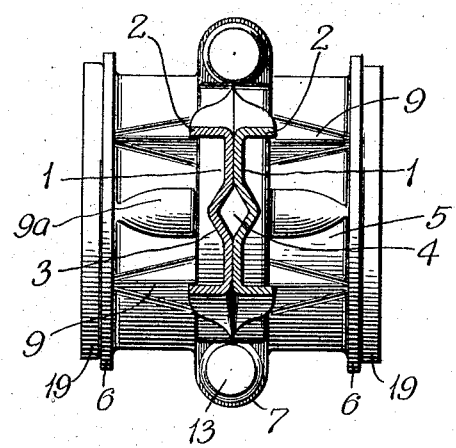
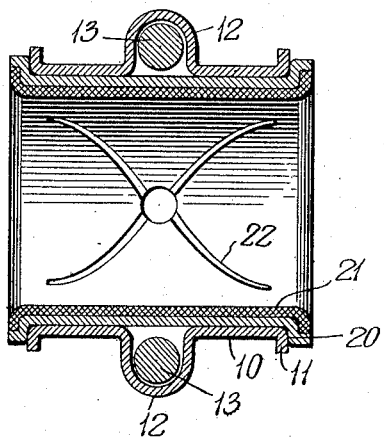
Inventor
Alexis R. Pribil,

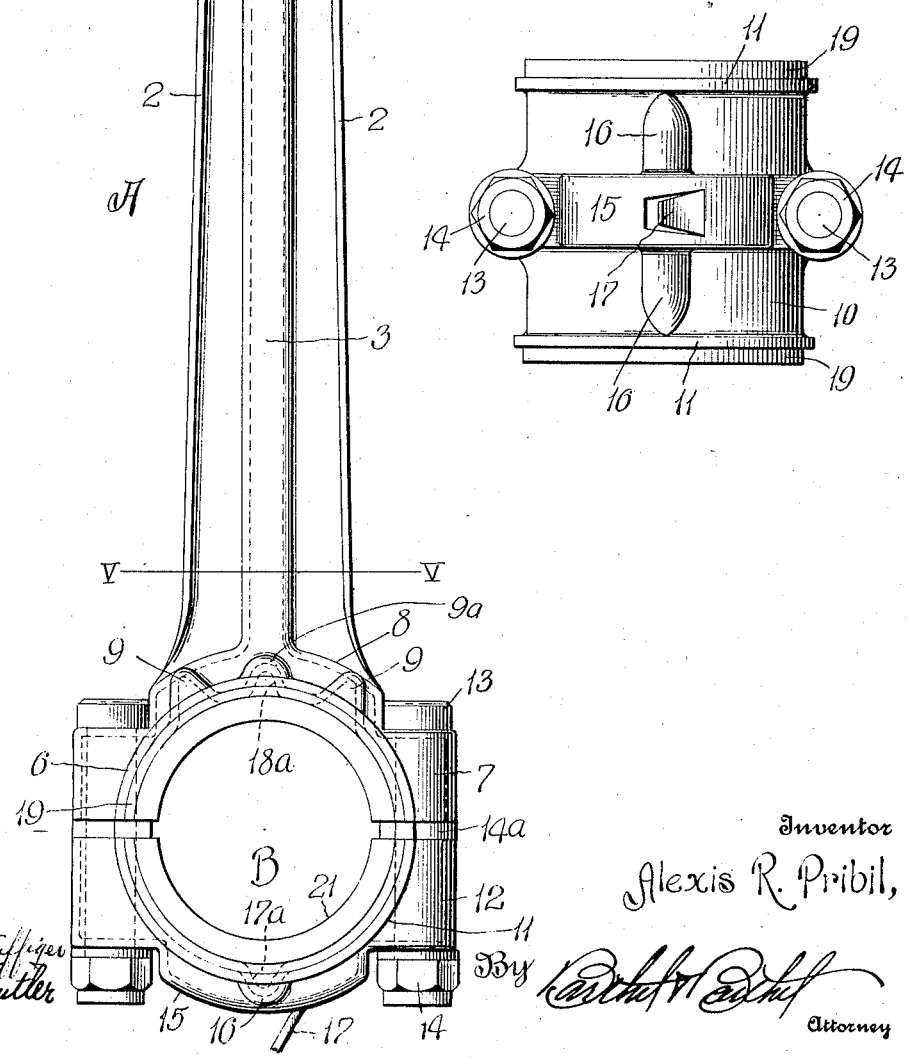

UNITED STATES PATENT OFFICE.

ALEXIS R. PRIBIL, OF WILKINSBURG, PENNSYLVANIA.

CONNECTING-ROD.

1,276,109.　　　　Specification of Letters Patent.　　Patented Aug. 20, 1918.

Application filed December 26, 1916. Serial No. 138,955.

*To all whom it may concern:*

Be it known that I, ALEXIS R. PRIBIL, a citizen of the United States of America, residing at Wilkinsburg, in the county of Allegheny and State of Pennsylvania, have invented certain new and useful Improvements in Connecting-Rods, of which the following is a specification, reference being had therein to the accompanying drawings.

This invention relates to connecting rods, and more particularly to a rod fabricated from pressed steel parts.

My invention aims to provide a pressed steel connecting rod possessing practically the same rigidity and strength as a drop forged steel rod by reason of the pressed steel parts having shapes that distribute stresses and strains throughout the rod and in such directions that it is practically impossible to distort any part of the rod.

My invention further aims to provide pressed steel connecting rods having novel drive and driven ends which are constructed to facilitate installing the connecting rod and to withstand wear at the piston and crank shaft connections. The driven or crank end of the connecting rod includes reinforcing ribs at the base of the rod shank precluding cracking or breaking at the juncture of the rod shank and the housing thereof. The driven or crank end of the connecting rod also includes a novel splash member that insures thorough lubrication of parts in the organization of the housing forming the driven or crank end of the rod. The drive or piston end of the rod includes novel clamping means by which piston pin bearing rings, bushings or other parts may be retained in engagement therewith, and between the drive and driven ends of the rod there is a shank having a cross sectional area which positively precludes any buckling or distorting of the rod when in use.

My invention further aims to provide a pressed steel connecting rod wherein the parts are constructed with a view of reducing the cost of manufacture and at the same time retain the above and other features.

With these ends in view, my invention resides in the novel construction, combination and arrangement of parts to be hereinafter specifically described and then claimed and reference will now be had to the drawings, wherein Figure 1 is a side elevation of a pressed steel connecting rod in accordance with my invention;

Fig. 2 is a bottom plan of the rod or the driven end thereof;

Fig. 3 is a longitudinal sectional view of a connecting rod;

Fig. 4 is a horizontal sectional view of the driven end thereof; and

Fig. 5 is a cross sectional view taken on the line V—V of Fig. 1.

In describing my invention by aid of the views above referred to, I desire to point out that the same are intended as merely illustrative of the connecting rod as now constructed, and I do not care to confine my invention to the precise construction and arrangement of parts shown. The following description is therefore to be broadly construed as including such substitute constructions and arrangements of parts which are the obvious equivalents of those to be hereinafter referred to.

In the drawing, the reference character A generally denotes the rod shank, B the driven or crank end thereof, and C the drive or piston end of the rod.

The rod shank A is composed of two channel members 1 arranged back to back, as best shown in Fig. 5, and these members are gradually tapered from the driven end B to the drive end C so that the rod shank A will be of less cross sectional area adjacent the drive end, than at the driven end. By arranging the members 1 back to back the side flanges 2 of said members constitute stiffening ribs at both sides of the rod shank and throughout the length thereof and thereby impart a somewhat girder construction to the rod shank. Longitudinally and centrally of the channel members 1 are embossed or pressed out ribs 3 forming a core or bore 4 and the ribs 3 coöperate with the flanges 2 in adding rigidity to the rod shank.

The driven or crank end B of the connecting rod is in the form of a cylindrical housing adapted to embrace a crank pin or the crank portion of a driven shaft and to form this housing, the ends of the channel members 1 are shaped to provide a fixed portion of the housing, and associated therewith is a detachable portion of the housing which permits of the easy installation of the connecting rod.

The lower or large ends of the channel members 1 terminate in alining semi-cylindrical sleeves 5 having the outer ends thereof reamed or outturned, as at 6, to stiffen said semi-cylindrical sleeves 5. Intermediate the ends of the semi-cylindrical sleeves 5 there are pressed out apertured bosses 7 and bracing these bosses relative to the central ribs 3 of the members 1 are pressed out portions 8 on said members, said pressed out portions establishing communication between the bosses 7 and the core 4 of the rod shank, as best shown in Fig. 3. The members 1 have the lower or large ends thereof extended to the juncture of the bosses 7 with the pressed out portions 8, and the flanges 2 of the members 1 gradually merge into the plane of the members 1 at the juncture of the bosses 7 and the pressed out portion 8, as best shown in Fig. 1. It is therefore evident that the extended walls of the members 1 and the pressed out portions 8 will brace the bosses 7 intermediate the ends of the semi cylindrical sleeves 5, and as a further strength reinforcement, the semi-cylindrical sleeves 5 are pressed out to provide sets of longitudinal webs 9 extending from the outer ends of the semi-cylindrical sleeves 5 to the pressed out portions 8 so as to brace said portions intermediate the bosses 7 and the lower ends of the ribs 3. The webs 9 are triangular in elevation and have certain walls thereof disposed practically in the same plane as the flanges 2, so that there will be a longitudinal thrust resisting structure throughout the length of the connecting rod that will make it impossible for any part of the rod to collapse when subjected to excessive stresses or strains. The sleeves 5 also have pressed out key-ways $9^a$ parallel with the webs 9, the purpose of which will hereinafter appear.

The detachable portion of the driven end housing comprises a semi-cylindrical sleeve 10 having outturned stiffened ends 11. This semi-cylindrical sleeve, intermediate the ends thereof, is provided with apertured pressed out bosses 12 adapted to register and aline with the bosses 7 of the fixed portion of the housing so as to be connected thereto by bolts 13, and nuts 14 or other fastening means. The bolts 13 are prevented from rotating by the heads thereof having facets engaging the pressed portions 8, as best shown in Fig. 1. A shim $14^a$ is interposed between the bosses 7 and 12 or the confronting edges of the semi-cylindrical sleeves 5 and 10.

Connecting the pressed out bosses 12 is a pressed out rib 15 and intermediate the longitudinal edges of the semi-cylindrical sleeve 10 is a longitudinal pressed out rib or key-way 16. At the juncture of the ribs 15 and 16, as shown in Fig. 2, there is a stamped out depending and angularly disposed splash member 17 which will again be referred to.

In the semi-cylindrical sleeves 5 and 10 is placed a bushing 18, preferably made of brass, and this bushing has collars 19 at the ends thereof engaging the outturned ends 6 and 11 of the semi-cylindrical sleeves 5 and 10. The collars 11 provide annular seats 20 for the flared ends of a liner or bearing ring 21 mounted in the bushing 18. The liner or bearing ring 21 may be conveniently made of babbitt or lubricant holding metal. The collars 19 on the ends of the bushing prevent spreading or lateral displacement of the semi-cylindrical sleeves 5 relative to each other, irrespective of whether the members 1 are brazed, spot welded, riveted, interlocked or otherwise connected. The bushing 18 has key-portions $18^a$ and $17^a$ extending into the key-ways $9^a$ and 16 respectively and in this manner the bushing is held against rotation.

I attach considerable importance to the fact that the semi-cylindrical sleeve 10 serves as a one-piece cap or detachable housing that is attached to the semi-cylindrical sleeves or fixed housing 5 and when the bushing is in place the driven end of the members 1 are positively tied together and stiffened by the collars 19 at the ends of the bushing 18. This construction prevents any movement of the bolts 13 or the shims $14^a$, consequently there is no chance of the parts cutting, wearing, rattling or becoming accidentally displaced.

The liner or bearing ring 21 and the bushing 18 may be grooved and ported for lubrication purposes, and with the grooves and ports generally designated 22 in communication with the pressed out ribs 15 and 16, there is a splash system of distributing a lubricant to the driven end of the connecting rod which is a desideratum in connection with such structures. Assuming that the driven end of the connecting rod is on the crank portion of a driven shaft operating in a crank case, constituting a lubricant well or reservoir, of an engine, and furthermore that the shaft and connecting rod are in operation, the splash member 17 will cause lubricant to enter the ribs 15 and 16 and pass through the ports and grooves, generally designated 22 to parts of the driven end subjected to wear or friction. It will be noted that the ribs 15 and 16 are in communication with the bosses 12, consequently a lubricant may be distributed throughout the bushing and liner when the connecting rod is in operation.

Considering now the driving end C of the connecting rod, the ribs 3 of the members 1 terminate at semi-cylindrical pressed sleeves 23 disposed transversely of said members, and the flanges 2 conform to the periphery of said semi-cylindrical sleeves and continue as annular flanges 24 surrounding and spaced from pressed out complete sleeves 25 having the longitudinal axis thereof at right angles to a bolt opening 26 formed by the semi-cylindrical sleeves 23. The sleeves 25 will accommodate a piston pin, bushing, liner or bearing ring and afford means of connecting the drive end C of the rod to a piston or similar structure. This end of the rod may be sprung or clamped upon a piston pin, bushing, liner or bearing ring by slitting or bifurcating the members 1, as at 27, from the ends of the ribs 3 to the sleeves 25, and then using a bolt 28 and a nut 29 for drawing or springing the bifurcated portions together. The semi-cylindrical sleeves 23 accommodate the bolt 28 and with the head and nut of the bolt against the flanges 2 it is possible to contract the sleeves 25 to firmly hold a desired member or members within the sleeves. This construction obviates welding parts of the connecting rod, drilling or boring the drive end thereof, or performing any operations other than tightening the bolt 28 to clamp the drive end on a member.

From the foregoing it will be noted that connecting rods of uniform weight, less weight and fewer parts can be produced with less labor and at a comparatively low cost, and in the end, there is a better lubrication than possible with other connecting rods.

I would have it understood that the members 1 may be off-set relative to the housing at the lower ends of said members, and that the connecting rods may be used in pairs or twin relation, particularly in connection with an eight or twelve cylinder engine.

What I claim is:—

1. A connecting rod having a shank portion and drive and driven ends, the shank portion being composed of channel members arranged back to back with the flanges of one member in a plane with the flanges of the other member, said members having pressed alining sleeves at the driven end with flanges on said members surrounding said sleeves, and pressed out ribs extending longitudinally and transversely of the sleeve adjacent said members with some of said ribs joining said members.

2. A connecting rod comprising a shank portion having drive and driven ends, said shank portion being composed of channel members arranged back to back and having piston pin sleeves at the drive end of said rod and surrounded by flanges of said channel members, registering sleeves at the drive end of said shank portions having the axis thereof at a right angle to the axis of the piston pin sleeves of said members, said members having a bifurcation separating the piston pin sleeves thereof, and means abutting flanges of said channel members and extending through the bifurcation thereof adapted for contracting the piston pin sleeves of said members.

3. A connecting rod comprising a shank composed of members stamped out at one end thereof to provide sets of registering sleeves with the axes of the set of sleeves at right angles to each other and to the longitudinal axis of the connecting rod, said members having a bifurcation extending from one set of sleeves between the sleeves of the other set, and means between said members and transversely of the bifurcation thereof adapted for contracting said sleeves.

4. A connecting rod comprising channel members arranged back to back with the flanges of one member in a plane with the flanges of the other member, longitudinal pressed out ribs arranged centrally of said members, and pressed out sleeves at the upper ends of said members, said members having a bifurcation extending from said ribs to said sleeves, and means between said members adapted for contracting the bifurcated portions thereof.

5. A connecting rod comprising channel members disposed back to back with the flanges of one member in a plane with the flanges of the other member, and sets of registering sleeves at the upper ends of said members and having the flanges of said members spaced from one set of sleeves and on the peripheries of the other set of sleeves, said members being bifurcated adjacent said sleeves, and means between said members at the bifurcation thereof adapted for contracting said sleeves.

6. A connecting rod comprising a shank portion having a driven end, said shank portion being composed of channel members, semi-cylindrical sleeves at the lower ends thereof, flanges at the outer ends of said sleeves, pressed out ribs connecting the flanges of said sleeves and the shank portion of said rod, apertured bosses carried by said sleeves, a one-piece semi-cylindrical sleeve having apertured bosses connected to the first mentioned apertured bosses and end flanges matched with the first mentioned flanges, and a bushing in said sleeves having collars at the ends thereof holding said members together.

7. A connecting rod comprising channel members disposed back to back and provided with longitudinal central ribs, semi-cylindrical sleeves at the lower ends of said members, apertured bosses and pressed out portions connecting said bosses with the ribs of said members, longitudinal ribs on said sleeves, a one piece semi-cylindrical sleeve in matched relation to the sleeves of said members and having bosses adapted for attachment to the first mentioned bosses and connected by a pressed out rib, and means connecting the bosses of said sleeves.

8. A connecting rod composed of channel members disposed back to back and provided with central longitudinal pressed out ribs, semi-cylindrical sleeves at the lower ends of said members providing a housing, bosses carried by said semi-cylindrical sleeves, and connecting said semi-cylindrical sleeves together, pressed out portions connecting some of said bosses to the ribs of said members, a pressed out rib connecting other bosses, and a splash member carried by said rib.

9. A connecting rod having a driven end composed of semi-cylindrical connected sleeves, a hollow rib on one of said semi-cylindrical sleeves, and a splash member carried by said rib.

In testimony whereof I affix my signature in the presence of two witnesses.

ALEXIS R. PRIBIL.

Witnesses:
 KARL H. BUTLER,
 ANNA M. DORR.